United States Patent
Schmierl et al.

[15] 3,662,663
[45] May 16, 1972

[54] FILM METERING MECHANISM
[72] Inventors: Richard Schmierl, Unterhaching; Dieter Maas, Munich, both of Germany
[73] Assignee: AGFA-Gevaert Aktiengesellschaft, Leverkusen, Germany
[22] Filed: Sept. 26, 1969
[21] Appl. No.: 861,281

[30] Foreign Application Priority Data

Sept. 28, 1968 Germany...................P 17 97 44.6

[52] U.S. Cl..........................................95/31 FM, 95/31 FL
[51] Int. Cl...........................................G03b 1/62, G03b 17/42
[58] Field of Search ..............................................95/31 FM

[56] References Cited

UNITED STATES PATENTS

| | | | |
|---|---|---|---|
| 1,828,205 | 10/1931 | Schmitt et al. | 95/31 FM |
| 2,559,892 | 7/1951 | Mihalyi et al. | 95/31 FM |
| 3,416,425 | 12/1968 | Rigolini | 95/31 FM |
| 3,148,605 | 9/1964 | Peterson et al. | 95/31 FM |
| 3,416,424 | 12/1968 | Harvey | 95/31 FM |
| 3,232,196 | 2/1966 | Sapp, Jr. et al. | 95/31 FM |
| 3,406,621 | 10/1968 | Irwin | 95/31 FM |
| 3,253,526 | 5/1966 | Steisslinger | 95/31 FM |

*Primary Examiner*—Samuel S. Matthews
*Assistant Examiner*—Russell E. Adams, Jr.
*Attorney*—Michael S. Striker

[57] ABSTRACT

A still camera for use with roll film of the type having a row of perforations, one for each film frame, wherein the housing accommodates a lever biased from a starting to an operative position in which the lever prevents further operation of the film transporting mechanism. A tracking arm of the lever enters an oncoming perforation in response to transport of the film and thereby permits movement of the lever to operative position. A follower on the lever holds the tracking arm away from the film path when the lever is returned to starting position in response to actuation of the shutter release and prior to renewed operation of the film transporting mechanism so that the tracking arm cannot reenter the same perforation.

8 Claims, 3 Drawing Figures

PATENTED MAY 16 1972　　　　　　　　　　　　　　　　3,662,663

INVENTOR.
RICHARD SCHMIERL
DIETER MAAS
BY
Michael S. Striker
Attorney

FILM METERING MECHANISM

BACKGROUND OF THE INVENTION

The present invention relates to photographic apparatus in general, especially to still cameras which utilize roll film. More particularly, the invention relates to photographic apparatus for use with roll film of the type having a row of perforations, one for each film frame. Still more particularly, the invention relates to improvements in devices which insure that the film is transported only by the length of a frame in response to each manipulation of the film transporting mechanism.

It is already known to provide photographic apparatus with devices which control the operation of the film transporting mechanism in such a way that the film is transported only by the length of a frame in response to each manipulation of the film transporting mechanism. Presently known devices of the above outlined character are rather bulky, complicated and/or expensive so that they are not suited for used in popularly priced compact cameras.

SUMMARY OF THE INVENTION

An object of our invention is to provide a photographic apparatus for use with roll film of the type having a row of perforations, one for each film frame, with a novel and improved device which prevents further transport of roll film as soon as the transport of film by the length of a frame is completed.

Another object of the invention is to construct and install the novel device in such a way that it automatically releases the film transporting mechanism in response to making of an exposure so that the user of the apparatus is free to advance the film again by the length of a frame.

A further object of the invention is to provide a still camera which embodies the aforementioned device and wherein such device occupies little room and includes a small number of simple and inexpensive parts.

The improved photographic apparatus comprises a housing having guide means defining a film path, transporting means operative to advance the film lengthwise along the film path, control means movable in the housing between starting an operative positions and including a blocking portion (e.g., a pawl) arranged to prevent operation of the transporting means in operative position of the control means and a tracking portion adjacent to the film path and arranged to enter an oncoming perforation to thereby permit movement of the control means from starting to operative position, actuating means (preferably constituting the shutter release) for moving the control means from operative position back to starting position (preferably against the action of one or more springs which may form an integral part of the control means), and a novel distancing device for holding the tracking portion against re-entry into the same perforation in response to movement of the control means to starting position and prior to renewed operation of the transporting means.

The distancing device preferably comprises a follower which is movable with reference to the control means and is mounted on or integral with such control means. The follower engages the film or a stationary cam in the starting position of the control means to thereby hold the tracking portion away from the film path; once the transporting means is operated to advance the film lengthwise upon completion of an exposure, the follower is disengaged from the film or from the aforementioned cam and thus permits the tracking portion to engage the film and to enter an oncoming perforation as soon as the film is advanced by the length of a frame.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
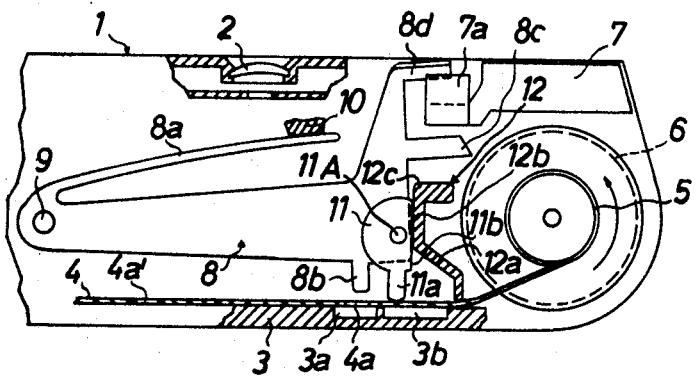
FIG. 1 is a fragmentary horizontal sectional view of a still camera which embodies one form of the invention, the control means being shown in the starting position.
Figure 2:
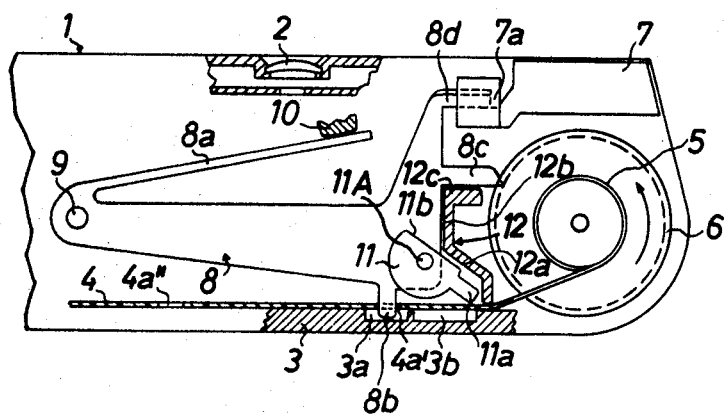
FIG. 2 illustrates the structure of FIG. 1 but showing the control means in its operative position.

Referring first to FIGS. 1 and 2, there is shown a still camera which comprises a housing or body 1 whose front wall supports an objective lens 2. The rear wall 3 of the housing 1 constitutes a guide for roll film 4 which is formed with a row of perforations 4a, 4a', 4a'' ..., one for each film frame. The film transporting mechanism comprises a takeup reel 5 which is rotatable in a counterclockwise direction by means of a lever or wheel, not shown. The takeup reel 5 is rotatable with a toothed ratchet wheel 6. The release for the shutter (not shown) comprises a depressible actuating member or knob 7 having an inclined surface 7a.

The camera further comprises a control member 8 which is a lever turnable on a fixed pivot pin 9. This lever includes an elastic first arm 8a which bears against a stationary stop 10 and tends to pivot the remaining arms of the lever 8 in a clockwise direction, as viewed in FIG. 1. A second arm 8b of the control lever 8 serves as a means for tracking the inner side of the film 4 along the row of perforations. A third arm 8c of the control lever 8 constitutes a blocking pawl which can engage the ratchet wheel 6 of the film transporting mechanism when the tip of the tracking arm 8b is free to penetrate into a perforation. A fourth arm 8d of the control lever 8 is adjacent to the inclined surface 7a and causes the lever 8 to pivot in a counterclockwise direction to stress the arm 8a in response to depression of the knob 7.

The camera of FIGS. 1 and 2 further comprises a distancing device having a follower 11 which is turnably mounted on the control lever 8 adjacent to the tracking arm 8b and close to a stationary distancing cam 12. The rivet or pin which connects the follower 11 to the control lever 8 is shown at 11A. This follower 11 comprises a projection 11a which can engage the film 4 to thereby hold the tip of the tracking arm 8b away from the film path, and a straight face 11b which can engage the face 12a or 12b of the cam 12. The guide 3 is formed with two openings or recesses 3a, 3b; the recess 3a can receive the tip of the tracking arm 8b and the recess 3b can receive the projection 11a of the follower 11.

The operation:

In order to make an exposure, the user of the camera depresses the knob 7 whereby the inclined surface 7a pivots the arms 8b, 8c, 8d of the control lever 8 in a counterclockwise direction and stresses the elastic arm 8a. The control lever then assumes the starting position shown in FIG. 1. Depression of the knob 7 results in opening of the shutter and in exposure of that film frame which is located behind the objective lens 2. Such depression of the knob 7 also causes the arm 8c to become disengaged from the teeth of the ratchet wheel 6 and the arm 8b to withdraw its tip from the adjoining perforation 4a (FIG. 1). At the same time, the straight face 11b of the follower 11 travels from engagement with the cam face 12a into engagement with the cam face 12b so that the projection 11a bears against the inner side of the film 4 and prevents the tip of the tracking arm 8b from re-entering the adjoining perforation. This is the first position of the follower 11. The operator then actuates the aforementioned lever or wheel of the film transporting mechanism to turn the takeup reel 5 and the ratchet wheel 6 in a counterclockwise direction so that the film 4 travels in a direction to the right. The arm 8a biases the arms 8b –8d in a clockwise direction and this arm 8a also urges the projection 11a against the inner side of the traveling film 4 so that the projection 11a (*i.e., automatically enters the oncoming perforation 4a* i.e., that perforation from which the tip of the tracking arm 8b was withdrawn during the preceding depression of the knob 7). It will be seen that the projection 11a prevents the tip of the arm 8b from re-entering the same perforation (4b) upon completed depression of the knob 7; such reentry of the tip of arm 8b would prevent transport of the film 4 prior to making of the next exposure.

Once the projection 11a has entered the oncoming perforation 4a, the follower 11 begins to turn on the pin 11A in a counterclockwise direction, as viewed in FIG. 1 so that its face 11b moves away from engagement with the cam face 12b and engages the cam face 12a. The projection 11a then leaves the perforation 4a in response to further rightward transport of the film (this is the second position of the follower 11) and the tip of the arm 8b is free to enter the oncoming or next-following perforation 4a' and to penetrate into the recess 3a of the guide 3, i.e., the control lever 2 is free to assume the operative position shown in FIG. 2. At the same time, the arm 8c engages the ratchet wheel 6 and holds the takeup reel 5 against further anticlockwise rotation at the exact moment when the transport of film 4 by the length of a frame is completed. The arm 8c then abuts against the adjoining face 12c of the cam 12 (see FIG. 2). The camera is ready for the next exposure which is made in response to renewed depression of the knob 7 whereby the control member 8 returns to the starting position shown in FIG. 1 and the user is again free to transport the film by the length of a frame. In FIG. 1, the projection 11a extends substantially at right angles to and engages the inner side of the film 4; this projection then extends beyond the tip of the tracking arm 8b so that the latter cannot reenter the perforation 4a from which it was withdrawn in response to depression of the knob 7. The cam 12 returns the follower 11 from the second position of FIG. 2 to the first position of FIG. 1 in response to each depression of the knob 7.

Figure 3:
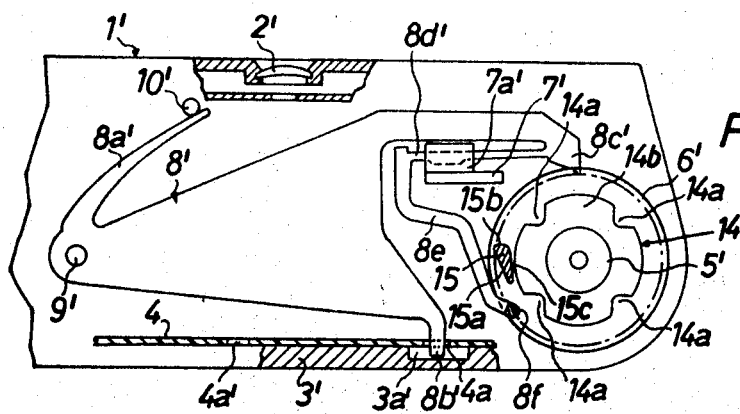
FIG. 3 is a fragmentary horizontal sectional view of a second still camera, showing a modified control means in its operative position.

FIG. 3 illustrates a portion of a second still camera wherein all such parts which are clearly analogous to the corresponding parts of the camera shown in FIGS. 1-2 are denoted by similar reference characters each followed by a prime. The follower 11 is replaced by an elastically deformable fifth arm or follower 8e which is integral with or connected to the arm 8d' and is provided with a bent-over end portion or finger 8f. The ratchet wheel 6' is rigid with a rotary disk-shaped distancing cam 14 having four equidistant peripheral notches 14a. A stationary distancing cam 15, having two cam faces 15a and 15b, is adjacent to the follower arm 8e.

When the user depresses the knob 7' to make an exposure, the inclined surface 7a' pivots the arms 8b', 8c', 8d', 8e of the control lever 8' in a counterclockwise direction to stress the arm 8a' and to withdraw the tip of the arm 8b' from the adjoining perforation 4a in the roll film 4. At the same time, the arm 8c' becomes disengaged from the ratchet wheel 6'. Depression of the knob 7' causes the finger 8f of the arm 8e to slide along the face 15a of the fixed cam 15 and to engage the face 15b so that the arm 8e then holds the arm 8b' away from the film path. The finger 8f then also bears against one of four lobes 14b on the rotary cam 14. The user thereupon rotates the takeup reel 5' to advance the film 4 by the length of a frame. The ratchet wheel 6' and the cam 14 share such rotary movement of the takeup reel 5' and the finger 8f is free to enter the oncoming notch 14a of the rotating cam 14. Thus, the finger 8f is then free to bypass the fixed cam 15 by travelling along the right-hand face 15c of this fixed cam under the action of the arm 8a'. Once the finger 8f has moved beyond the cam face 15c, the arm 8a' is free to propel the arms 8b', 8c', 8d', 8e in a clockwise direction so that the arm 8b' engages the inner side of the advancing film 4 and enters the oncoming perforation 4a' as well as the opening or recess 3a' in the guide 3' (the opening 3b is not needed because the finger 8f need not penetrate into the perforations of the film 4). The transport of film is completed as soon as the tip of the arm 8b' enters the perforation 4a' because the arm 8c' then engages the wheel 6' and holds the takeup reel 5' against further rotation in a counterclockwise direction (such position of the arm 8c' is shown in FIG. 3). The next exposure is made in response to renewed depression of the knob 7'.

Certain modifications can be made in the camera of FIGS. 1-2 or in the camera of FIG. 3 without departing from the spirit of our invention. For example, the parts 5, 6 or 5', 6', 14' may be made of a single piece of metallic or synthetic plastic material. Furthermore, the control lever 8 or 8' can be replaced with a slide which is reciprocable between starting and operative positions.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a photographic apparatus for use with roll film of the type having a row of perforations, one for each film frame, a combination comprising a housing having guide means defining a film path; transporting means operative to advance the film lengthwise along said path; control means movable between starting and operative positions and including a blocking portion arranged to prevent the operation of said transporting means in the operative position of said control means and a tracking portion adjacent to said path and arranged to enter an oncoming perforation to thereby permit the movement of said control means from said starting position to said operative position; actuating means for moving said control means from said operative position to said starting position; and distancing means for holding said tracking portion against entry into the same perforation in response to movement of said control means to said starting position and prior to renewed operation of said transporting means, said distancing means including a follower movably secured to said control means adjacent to said tracking portion and comprising a projection which engages the film in said starting position of said control means to thereby hold said tracking portion against re-entry into the same perforation.

2. A combination as defined in claim 1, wherein said control means is permanently biased toward said operative position and said actuating means constitutes the shutter release.

3. A combination as defined in claim 1, wherein said projection is positioned to enter in response to operation of said transporting means that perforation from which the tracking portion is withdrawn on movement of said control means to starting position and to thereupon move with reference to said control means in response to continuing operation of said transporting means.

4. A combination as defined in claim 3, wherein said follower is pivotable with reference to said control means between first and second positions and pivots from said first position to said second position in response to operation of said transporting means while said projection extends into a perforation, said projection being arranged to leave such perforation in the second position of said follower to thus permit engagement of film by said tracking portion.

5. A combination as defined in claim 4, wherein said distancing means further comprises cam means provided in said housing to move said follower from second to first position in response to movement of said control means from operative to starting position.

6. In a photographic apparatus for use with roll film of the type having a row of perforations, one for each film frame, a combination comprising a housing having guide means defining a film path; transporting means operative to advance the film lengthwise along said path; control means movable between starting and operative positions and including a blocking portion arranged to prevent the operation of said transporting means in said operative position of said control means and a tracking portion adjacent to said path and arranged to enter an oncoming perforation to thereby permit the movement of said control means from said starting position to said operative position; actuating means for moving said control means from said operative position to said starting position; and distancing means for holding said tracking portion against re-entry into the same perforation in response to movement of said control means to said starting position and prior to renewed operation of said transporting means, said distancing means including a follower provided on said control means and comprising an elastically deformable arm, and a cam fixedly mounted in said housing and arranged to hold said arm in a first position in said starting position of said control means whereby said arm maintains said tracking portion out of contact with the film in said path.

7. A combination as defined in claim 6, wherein said control means is biased toward said operative position and wherein said distancing means further comprises a second cam movable by said transporting means to effect disengagement of said arm from said first mentioned cam in response to operation of said transporting means.

8. A combination as defined in claim 7, wherein said second cam is a rotary disk cam having alternating notches and lobes, said arm engaging one of said lobes in response to movement of said control means to starting position and entering one of said notches in response to rotation of said second cam to thereby bypass said first mentioned cam and permit engagement of traveling film by said tracking portion.

* * * * *